Patented July 26, 1949

2,477,225

UNITED STATES PATENT OFFICE 2,477,225

PROCESS OF PRODUCING STABILIZED VINYL ETHER POLYMERS

Abraham O. Zoss, Easton, Pa., assignor to General Aniline & Film Corporation, New York, N. Y., a corporation of Delaware No Drawing. Application December 27, 1944, Serial No. 570,045

6 Claims. (Cl. 260—91.1)

This invention relates to a process of producing stabilized vinyl ether polymers.

The vinyl ether polymers are sensitive to heat and by this agency suffer depolymerization or breakdown in molecular weight, chiefly to lower polymers and the alcohols from which the vinyl ether monomers were derived. Secondarily, the alcohols may undergo air oxidation to aldehydes, ketones, or acids. Depending upon the temperature and length of the exposure, the polymers lose their valuable properties to varying degrees, for example, the higher molecular weight polymers are subject to loss in their rubberlike properties of pressure tack, elasticity, nerve, and form stability. While the depolymerization is more rapid at elevated temperatures, it is not limited thereto, but takes place even at room temperature in contrast to the behavior of polystyrene and methyl methacrylate polymers which suffer depolymerization only at relatively elevated temperatures, e. g., at 200–300° C.

This sensitivity of the polymers to heat is a serious hindrance to their successful application in the arts, particularly in respect to the use of the medium to high molecular weight rubberlike polymers as substitutes for rubber, for example, in the preparation of pressure adhesives. It is, accordingly, desirable to protect them against thermal depolymerization and resulting loss in valuable properties.

Prior to the present invention it has been found that the resistance of polymerized vinyl ethers to depolymerization by heat may be improved by the incorporation in the formed polymers of a stabilizer in the form of a fine dispersion of a small amount of sulfur.

I have now found that the incorporation of the sulfur in the vinyl ether polymers may be accomplished by finely dispersing it in the vinyl ether monomer to be polymerized and contacting the sulfur-containing monomer in the presence of a liquid diluent with a catalyst promoting the polymerization of the monomer. An advantage of this method of incorporating the sulfur is the protection afforded the polymers against adverse conditions of heat even in the earliest stages of their existence. It was not to be expected that sulfur could be successfully incorporated in the polymers through addition to the monomer as sulfur is well known as an inhibitor of polymerization of styrene, methyl methacrylate and other monomers containing the vinyl group $CH_2=CH$.

The amount of sulfur added to the monomers will depend on the degree of stabilization desired in the polymers. While, in general, from about 0.02–3% of sulfur on the weight of the monomer will be effective in retarding depolymerization and conserving the inherent physical characteristics of the polymers on exposure to heat, an amount of sulfur in the range of 0.1–1.5% on the weight of the monomer is preferably employed. A finely divided sulfur such as flowers, colloidal or the grade known as fine rubbermaker's is employed for the stabilization. More coarsely divided sulfur is less effective.

Stabilization according to the invention may be applied to the polymers of any of the vinyl ethers, for example, to those described in United States Patent No. 2,104,000, e. g., to the polymers of vinyl isopropyl ether, vinyl n-butyl ether, vinyl isobutyl ether, etc., to protect them against the effect of heat, while at the same time affording them also a measure of protection against the depolymerizing effect of light and air. The sulfur-stabilized polymers may be, for example, in the form of products which are viscous liquids, balsams, waxes or soft resins as described in the aforesaid patent, or in the form of rubberlike products of higher molecular weight, e. g., the rubbery polymers described in United States Patent No. 2,061,934.

The sulfur may be added to the vinyl ether monomers in solution or suspension in a liquid which serves as a diluent for the monomer in the polymerization. Where the highest molecular weight rubberlike polymers are desired, the diluent for the monomer should be a non-solvent for the polymer at the temperatures prevailing in the polymerization reaction. Suitable diluents for the polymerization are, for example, liquid or liquefied hydrocarbons, chlorinated hydrocarbons, e. g., ethane, propane, butane, methylene chloride, chloroform, toluene, m-xylene and the like, or mixtures thereof. Depending upon the temperature at which the polymerization is to be conducted, the liquid diluent is selected in accordance with its boiling point. The amount of solvent or diluent used is not critical but may range from about 2 to 6 parts by weight to 1 part by weight of the monomer, the sulfur, diluent and monomer being thoroughly mixed as by stirring to effect a fine dispersion of the sulfur in the monomer.

Polymerization of the sulfur-containing vinyl ether monomers, singly or in admixture, may be carried out at the reaction temperatures described in United States Patent No. 2,104,000 or at lower temperatures, as described in United States Patent No. 2,061,934, down to about −110° C. depending upon the individual monomer and catalyst employed. The monomer containing the sulfur is contacted at these temperatures in the presence of the liquid diluent with a suitable acid-reacting condensing agent as polymerization catalyst or promoter, for example, aluminum chloride, boron fluoride, iron chloride, tin tetrachloride, stannous chloride, zinc chloride, sulfuric acid, hydrochloric acid, sulfur dioxide and the like. For best results the use of boron fluoride ($BF_3$) and the dialkyl ether addition products of boron fluoride, e. g., boron fluoride-diethyl ether and boron fluoride-dibutyl ether addition products, are recommended.

The catalyst need be used in only relatively small amounts, for example, in the proportions described in United States Patent No. 2,104,000, and is added gradually until the polymerization is completed. Depending on the activity of the individual catalyst the amount employed will vary. Where the addition products of the dialkyl ethers with boron fluoride are used, it is recommended that they be drawn from such as have been distilled under vacuum and freshly made or stored under refrigeration as such measures insure greater retention of their catalytic activity. To help avoid local overconcentration in the reaction mixture, the catalyst may be added in the form of a dilute solution or suspension in an inert organic liquid which is liquid at the polymerization temperatures. For this purpose, inert organic liquids which, when mixed with the liquid diluent for the monomer, serve to lower the freezing point of the diluent may be employed for low temperature polymerizations. As a catalyst diluent, toluene may be used generally. Ethyl chloride in the case of aluminum chloride and dioxane where the polymerization is conducted at temperatures of 0° C. and above, also may be used for the introduction of the catalyst into the monomer. In the case of dialkyl ether addition compounds of boron fluoride, aluminum chloride, and of the like halides, they may be dissolved in a further quantity of the corresponding dialkyl ether. Completion of the polymerization may be determined by the absence of heating or discoloration in a sample of the reaction mixture to which a small portion of the catalyst has been added.

The polymerization may be conducted by adding the catalyst to the sulfur-containing monomer under atmospheric conditions, although it is preferred to conduct the polymerization in the essential absence of oxygen, that is, in an atmosphere of an inert gas, such as nitrogen, or carbon dioxide, the latter being conveniently provided in the case of polymerization at low temperatures by the addition of solid carbon dioxide to the reaction mixture followed by venting for removal of air. For the production of uniform, highest molecular weight polymers, both the catalyst and the liquid diluent mixture of the sulfur-containing monomer should be precooled to reaction temperature before contact and close control of the temperature of the reaction practiced, by, for example, the portionwise addition of the catalyst to the monomer and stirring of the reaction mixture to avoid local oveheating, and by employing refrigerating means, such as the addition of solid carbon dioxide to the reaction mass or the application of a refrigerant bath to the reaction vessel or both. By so conducting the polymerization, production of undersired low molecular weight nonrubbery polymers is avoided or minimized. As a practical matter, the reaction temperature should be maintained above the point where the reaction becomes so slow as to approach zero in degree of activity, which point will vary with individual vinyl ether monomers and also with the liquid diluent employed.

When the polymerization has been finished, the catalyst is inactivated or quenched by stirring or otherwise working the polymer with substances which bind or stop the activity of the catalyst, for example, with alkaline-reacting substances, such as concentrated ammonium hydroxide. Preferably, the quenching agent is precooled to the reaction temperature, and the reaction mixture also maintained at these temperatures during the quenching to insure against the formation of undesirable lower molecular weight polymers from any unreacted monomer, especially where a uniform highest molecular weight polymer is desired. The polymer is then separated from the reaction mixture as by filtration, washed, if desired, with a nonsolvent for the polymer, e. g., methanol, to remove residual impurities, and dried under a vacuum or at normal pressure at a temperature of about 50° C.

The vinyl ethers employed in the production of the polymers may be those obtained from the reaction of acetylene and the corresponding alcohols, which monomers have been subjected to washing with water to remove alcohol and any aldehyde present. In some cases it may be necessary to further purify the monomers as alcohols and adehydes are inimical to the functioning of acid-reacting catalysts. This further purification may be accomplished by allowing the monomers to stand over powdered potassium hydroxide and metallic sodium for about 24 hours and then fractionally distilling them from the solid treating agent. One precise fractional distillation is generally sufficient.

The effect of sulfur in stabilizing the polymers against depolymerization by heat may be demonstrated in terms of the viscosities of the stabilized and unstabilized polymers before and after heating. The drop in viscosity of the polymers after exposure to heat is a measure of the degree to which depolymerization has taken place therein, the greater this drop, the correspondingly greater the depolymerization and consequent loss of physical properties therefrom. All viscosities mentioned herein are specific viscosities calculated from relative viscosities determined in an Ostwald-Fenske capillary viscometer on benzene solutions at 25° C. of the ploymer samples made up in the proportion of 1 gram of the ploymer in 100 ml. of benzene.

The invention is further illustrated by the following specific examples to which, however, it is not to be limited. Parts are by weight and viscosities were determined as described above. The vinyl monomers were purified by standing over powdered potassium hydroxide for 24 hours and given one precise fractional distillation therefrom.

*Example 1*

A rubberlike polymer of vinyl n-butyl ether was formed by the dropwise addition of chilled, vacuum distilled, diethyl ether-boron fluoride complex to a stirred mixture, maintained at about −78° C., of 50 parts of vinyl n-butyl ether in 200 parts of propane containing 0.5 parts (1% on the monomer) of finely dispersed sulfur. After the polymerization sufficient concentrated ammonium hydroxide to neutralize the boron fluoride present was thoroughly stirred into the polymer mass in the reaction vessel. The propane was then allowed to boil off and the polymer dried at about 50° C. in a vacuum. A polymer prepared in the same manner but without the addition of sulfur served as the control.

Samples of the polymers were then heated in air at 100° C. for 24 hours and the following viscosities obtained:

| Polymer | Specific Viscosity | |
| --- | --- | --- |
| | Before Heating | After Heating |
| Control | 3.0 | 0.2 |
| Sulfur added | 3.0 | 2.9 |

The polymers in each case were tacky, rubberlike solids before heating. After the heating, the polymer stabilized with the sulfur was still tacky and rubbery, whereas the unstabilized polymer was degraded to a viscous liquid as is indicated by the relatively large drop in its viscosity.

*Example 2*

Employing the procedure of Example 1, a rubberlike polymer was prepared from a mixture of 10 parts of vinyl isobutyl ether in 40 parts of propane containing 0.1 part of sulfur finely dispersed therein. A rubberlike polymer was similarly prepared but without the addition of sulfur to serve as the control.

Samples of the polymers were heated in air at 100° C. for 24 hours. The viscosities obtained were:

| Polymer | Specific Viscosity | |
| --- | --- | --- |
| | Before Heating | After Heating |
| Control | 4.5 | 0.5 |
| Sulfur added | 10.0 | 7.5 |

The drop in viscosity of the control after heating shows depolymerization to have taken place therein to the extent of reducing it to a balsamlike liquid, whereas the sulfur-containing polymer retained substantially its initial elastic, rubbery character.

*Example 3*

In the manner of the preceding examples, but using as catalyst a solution of two parts diethyl ether and one part diethyl ether-boron fluoride, rubbery polymers of vinyl isopropyl ether were prepared, the one containing 1% on the monomer of finely dispersed sulfur and the other, being the control, no sulfur. Viscosities obtained after heating samples of the polymers in air at 100° C. for 24 hours were:

| Polymer | Specific Viscosity | |
| --- | --- | --- |
| | Before Heating | After Heating |
| Control | 2.3 | 0.1 |
| Sulfur added | 1.8 | 1.1 |

A comparison of the polymer viscosities in this instance also clearly shows the retarding effect of sulfur on the thermal depolymerization of vinyl ether polymers. Whereas the polymer containing sulfur was still an inherently elastic, rubberlike body after the heating, the unstabilized polymer suffered depolymerization to the extent of becoming a viscous liquid.

I claim:

1. A process of producing vinyl alkyl ether polymers of increased resistance to depolymerization by heat which comprises finely dispersing about .02–3% of sulfur in the vinyl alkyl ether monomer and polymerizing the sulfur-containing monomer in the presence of a liquid diluent with a catalyst selected from the group consisting of aluminum chloride, iron chloride, stannous chloride, tin tetrachloride, zinc chloride, boron fluoride and the dialkyl ether addition products of boron fluoride.

2. The process as defined in claim 1, wherein the catalyst is boron fluoride.

3. The process as defined in claim 1, wherein the catalyst is a boron fluoride-dialkyl ether addition compound.

4. A process of producing a vinyl isopropyl ether polymer of increased resistance to depolymerization by heat which comprises finely dispersing about 0.1–1.5% of sulfur in the vinyl isopropyl ether monomer and polymerizing the sulfur-containing monomer in the presence of a liquid diluent with boron fluoride-diethyl ether addition compound.

5. A process of producing a vinyl n-butyl ether polymer of increased resistance to depolymerization by heat which comprises finely dispersing about 0.1–1.5% of sulfur in the vinyl n-butyl ether monomer and polymerizing the sulfur-containing monomer in the presence of a liquid diluent with boron fluoride-diethyl ether addition compound.

6. A process of producing a vinyl isobutyl ether polymer of increased resistance to depolymerization by heat which comprises finely dispersing about 0.1–1.5% of sulfur in the vinyl isobutyl ether monomer and polymerizing the sulfur-containing monomer in the presence of a liquid diluent with boron fluoride-diethyl ether addition compound.

ABRAHAM O. ZOSS.

REFERENCES CITED

The following references are of record in the file of this patent:

UNITED STATES PATENTS

| Number | Name | Date |
| --- | --- | --- |
| 2,061,934 | Mueller-Cunradi | Nov. 24, 1936 |
| 2,104,001 | Reppe | Dec. 28, 1937 |
| 2,223,171 | Gaylor | Nov. 26, 1940 |
| 2,227,985 | Swan | Jan. 7, 1941 |
| 2,317,868 | Turner | Apr. 27, 1943 |